United States Patent
Chang

(10) Patent No.: US 10,648,162 B2
(45) Date of Patent: May 12, 2020

(54) SWIVEL-TYPE PRECISION CERAMICS CONTROL BALANCE VALVE

(71) Applicant: Hain Yo Enterprises Co., Ltd., Hemei Township, Changhua County (TW)

(72) Inventor: Chia-Po Chang, Hemei Township (TW)

(73) Assignee: HAIN YO ENTERPRISES CO., LTD., Changhua (TW)

( * ) Notice: Subject to any disclaimer, the term of this patent is extended or adjusted under 35 U.S.C. 154(b) by 118 days.

(21) Appl. No.: 15/843,015

(22) Filed: Dec. 15, 2017

(65) Prior Publication Data

US 2019/0186113 A1 Jun. 20, 2019

(51) Int. Cl.
| | |
|---|---|
| *F16K 17/38* | (2006.01) |
| *F16K 31/00* | (2006.01) |
| *F16K 11/074* | (2006.01) |
| *E03C 1/04* | (2006.01) |
| *G05D 23/02* | (2006.01) |

(52) U.S. Cl.
CPC .......... *E03C 1/041* (2013.01); *F16K 11/0743* (2013.01); *F16K 17/38* (2013.01); *F16K 17/386* (2013.01); *F16K 31/002* (2013.01); *G05D 23/022* (2013.01)

(58) Field of Classification Search
CPC .. F16K 17/386; F16K 31/002; F16K 11/0782; F16K 11/082; F16K 11/0743; F16K 11/0787; F16K 11/074; F16K 11/046; F16K 3/08; F16K 3/085; F16K 3/10; F16K 3/26; F16K 27/044; F16K 27/045; F16K 19/006; G05D 23/022; G05D 23/13; G05D 23/132; G05D 23/134

USPC .................................. 137/625.46, 898, 597
See application file for complete search history.

(56) References Cited

U.S. PATENT DOCUMENTS

| | | | | |
|---|---|---|---|---|
| 6,845,917 B1 * | 1/2005 | Chen | .................. | F16K 11/0787 137/625.28 |
| 7,806,134 B1 * | 10/2010 | Chang | ................ | G05D 23/1313 137/100 |
| 10,167,963 B1 * | 1/2019 | Chang | .................. | F16K 11/072 |
| 10,167,964 B1 * | 1/2019 | Chang | .................. | F16K 11/072 |
| 2011/0277855 A1 * | 11/2011 | Li | .......................... | F16K 31/002 137/468 |
| 2012/0152390 A1 * | 6/2012 | Chang | ................ | F16K 11/0787 137/843 |
| 2014/0345729 A1 * | 11/2014 | Chang | .................. | F16K 11/076 137/625.15 |
| 2014/0345730 A1 * | 11/2014 | Chang | .................... | F16K 11/18 137/625.17 |

(Continued)

*Primary Examiner* — Nelson J Nieves
(74) *Attorney, Agent, or Firm* — Che-Yang Chen; Law Office of Michael Chen

(57) ABSTRACT

A precision ceramics control balance valve includes a valve housing, a rotary base mounted in the valve housing, a valve lever mounted on the rotary base and protruding upward from the valve housing, a movable valve plate mounted in the valve housing and located under the rotary base, a fixed valve plate mounted in the valve housing and located under the movable valve plate, a valve seat mounted on a lower end of the valve housing to stop the fixed valve plate, the movable valve plate and the rotary base, a temperature limiting device mounted in the valve seat, a pedestal connected with the valve seat, and a balance unit mounted in the pedestal.

2 Claims, 18 Drawing Sheets

(56) References Cited

U.S. PATENT DOCUMENTS

| | | | |
|---|---|---|---|
| 2015/0144214 A1* | 5/2015 | Chang | F16K 11/02 |
| | | | 137/625.41 |
| 2016/0017578 A1* | 1/2016 | Chang | E03C 1/04 |
| | | | 137/315.09 |
| 2016/0237662 A1* | 8/2016 | Chang | F16K 11/0743 |
| 2018/0059693 A1* | 3/2018 | Rodriguez | G05D 23/1353 |
| 2018/0223508 A1* | 8/2018 | Fassolette | E03C 1/041 |
| 2018/0252324 A1* | 9/2018 | Yang | F16K 15/148 |
| 2018/0275695 A1* | 9/2018 | Chang | G05D 23/1313 |
| 2019/0101944 A1* | 4/2019 | Main | G05D 23/1313 |
| 2019/0138038 A1* | 5/2019 | Fassolette | G05D 23/1353 |

* cited by examiner

A-A

B-B

E-E

SWIVEL-TYPE PRECISION CERAMICS CONTROL BALANCE VALVE

BACKGROUND OF THE INVENTION

1. Field of the Invention

The present invention relates to a valve and, more particularly, to a swivel-type precision ceramics control balance valve for a faucet.

2. Description of the Related Art

A faucet comprises a precision ceramics control valve and a handle. A conventional control valve comprises a valve lever which is driven by the handle. When the handle is turned, the valve lever is driven and rotated to turn on the water (cold water or hot water) so that the water flows outward from the faucet. When the handle is further rotated, the valve lever is rotated to regulate the mixed proportion of the cold water and the hot water, so as to spray mixed water. However, the conventional control valve does not have temperature detecting and regulating functions and cannot introduce cold water to cool the hot water, so that when the temperature of the hot water is too high, the user is easily scalded by the hot water.

BRIEF SUMMARY OF THE INVENTION

In accordance with the present invention, there is provided a control balance valve comprising a valve housing, a rotary base mounted in the valve housing, a valve lever mounted on the rotary base and protruding upward from the valve housing, a movable valve plate mounted in the valve housing and located under the rotary base, a fixed valve plate mounted in the valve housing and located under the movable valve plate, a valve seat mounted on a lower end of the valve housing to stop the fixed valve plate, the movable valve plate and the rotary base, a temperature limiting device mounted in the valve seat, a pedestal connected with the valve seat, and a balance unit mounted in the pedestal.

The rotary base is locked onto the movable valve plate, and the valve lever drives the rotary base which drives the movable valve plate to rotate relative to the fixed valve plate, to change a relative position between the movable valve plate and the fixed valve plate, so as to turn on/off water of a faucet, to change a water flow rate, or to change a proportion of a mixture of cold and hot water. The movable valve plate is provided with a first cold water hole and a first hot water hole arranged diagonally. The first cold water hole and the first hot water hole extend upward from a bottom face of the movable valve plate. The first cold water hole is provided with a first extension to enlarge an extent of the first cold water hole. The first hot water hole is provided with a second extension to enlarge an extent of the first hot water hole. The fixed valve plate has a center provided with a second cold water hole and a second hot water hole. The second cold water hole is provided with a third extension. The second hot water hole is provided with a fourth extension. The fixed valve plate is provided with a first cold water channel and a first hot water channel. The fixed valve plate is provided with a first temperature regulating hole located between the first cold water channel and the first hot water channel. The valve seat includes an upper seat and a lower seat combined together. The upper seat has an interior provided with a receiving space for mounting the temperature limiting device. The upper seat of the valve seat has a top face provided with a third cold water hole, a third hot water hole, a second cold water channel, a second hot water channel and a second temperature regulating hole. The upper seat of the valve seat supports the fixed valve plate, the movable valve plate and the rotary base, and the fixed valve plate is secured on the top face of upper seat. The lower seat of the valve seat is provided with a cold water inlet hole, a hot water inlet hole, at least one cold water outlet hole and a mixed water outlet hole. The cold water inlet hole is connected with a cold water source, and the hot water inlet hole is connected with a hot water source. The third cold water hole, the third hot water hole, the second cold water channel, the second hot water channel and the second temperature regulating hole of the upper seat respectively align with the second cold water hole, the fourth extension, the first cold water channel, the first hot water channel and the first temperature regulating hole of the fixed valve plate. The first cold water hole and the first extension of the movable valve plate misalign with the first cold water channel and the first temperature regulating hole of the fixed valve plate, while the first hot water hole and the second extension of the movable valve plate misalign with the second hot water hole and the first hot water channel of the fixed valve plate under a normal state of the valve lever which is not operated, so that the cold water and the hot water are stopped by the movable valve plate and cannot flow outward from the faucet through the control balance valve.

The temperature limiting device includes a water dividing member, a cap, a support sleeve, a temperature detector, a water stop sleeve and a spring. The water dividing member is mounted between the upper seat and the lower seat of the valve seat. The water dividing member is provided with a fourth cold water hole connected between the third cold water hole and the cold water inlet hole, a fourth hot water hole connected between the third hot water hole and the hot water inlet hole, a third cold water channel connected between the second cold water channel and the at least one cold water outlet hole, a temperature control chamber connected between the second hot water channel and the mixed water outlet hole, a third temperature regulating hole aligning with the second temperature regulating hole of the upper seat, and a cold water passage connected between the third temperature regulating hole and the temperature control chamber. The cap is mounted in the temperature control chamber of the water dividing member. The cap has a periphery provided with a plurality of hot water passages. The support sleeve is mounted in the mixed water outlet hole of the lower seat and has an interior provided with a plurality of claws and a plurality of water outlet channels arranged between the claws. The temperature detector is mounted in the support sleeve and supported by the claws. The temperature detector has an opening provided with a push rod and a chemical substance. The chemical substance is filled between the temperature detector and the push rod. The chemical substance has a thermal expansion and contraction feature due to a temperature change of an ambient environment. When the chemical substance is heated and expanded, the push rod is pushed outward from the opening of the temperature detector by the chemical substance, and when the chemical substance is cooled and contracted, the push rod is retracted into the opening of the temperature detector. The water stop sleeve is mounted on the temperature detector and includes a tubular body, a cover located in the tubular body, and a bottom edge connecting the tubular body and the cover. The bottom edge is provided with a plurality of water passages. The push rod of the temperature detector extends into the cover. The spring is biased between the cap and the water stop sleeve. When the push rod is retracted at a normal state, the spring presses the water stop sleeve away from the cap to space the tubular body of the water stop sleeve from the hot water passages of the cap, thereby preventing the tubular body of the water stop sleeve from blocking the hot water passages of the cap. The water stop sleeve is lifted by the temperature detector, to prevent the tubular body of the water stop sleeve from blocking the cold water passage of the water dividing member, so that the cold water passage of the water dividing member is connected to the water outlet channels of the support sleeve constantly. The pedestal protrudes outward from a bottom face of the lower seat.

The pedestal is provided with a receiving chamber connected to the cold water inlet hole and the hot water inlet hole. The balance unit is mounted in the receiving chamber of the pedestal and includes two casings juxtaposed to each other, a fixed tube mounted between the two casings, and a movable core movably mounted in the fixed tube. Each of the two casings is provided with a mounting recess. Each of the two casings is provided with a water delivery hole connected to the mounting recess and extending through a top face and a bottom face of each of the two casings. The water delivery holes of the two casings align with the cold water inlet hole and the hot water inlet hole respectively. The fixed tube is secured in the mounting recess of each of the two casings and has a peripheral wall provided with two first breaches. The movable core has an interior provided with two compartments and a baffle between the two compartments. The movable core has a peripheral wall provided with two second breaches connected to the two compartments respectively. The movable core is movable in the fixed tube by variation of a water pressure of the cold and hot water, to change a relative position between the two second breaches of the movable core and the two first breaches of the fixed tube, so as to balance the water pressure automatically.

Further benefits and advantages of the present invention will become apparent after a careful reading of the detailed description with appropriate reference to the accompanying drawings.

BRIEF DESCRIPTION OF THE SEVERAL VIEWS OF THE DRAWING(S)

DETAILED DESCRIPTION OF THE INVENTION

Figure 1:
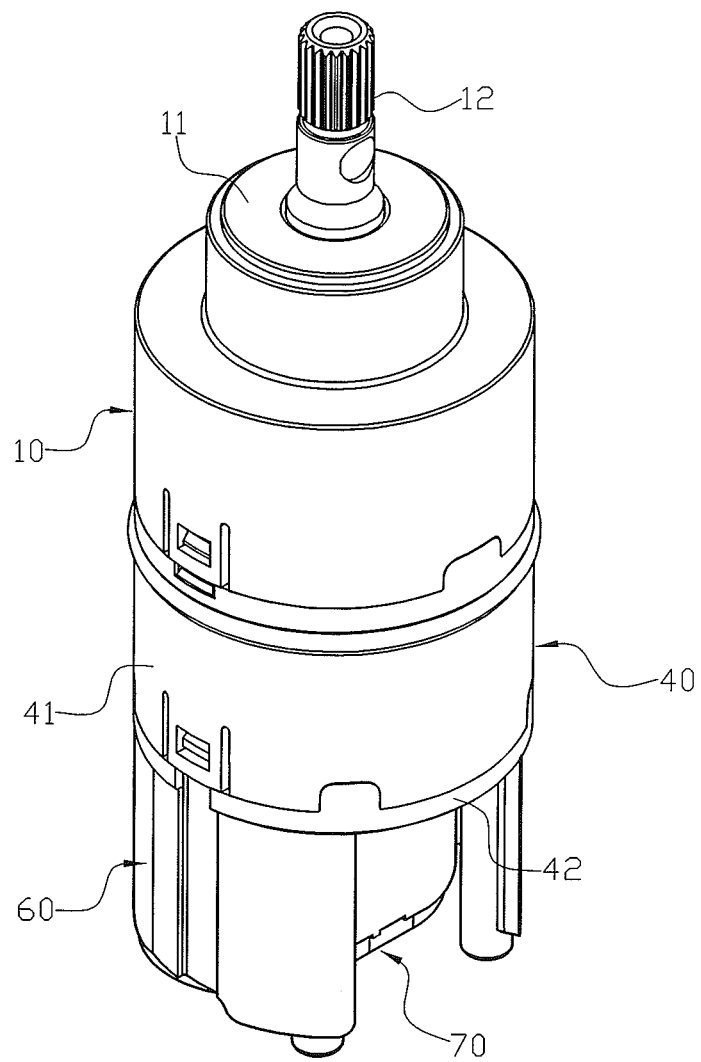
FIG. 1 is a perspective view of a control balance valve in accordance with the preferred embodiment of the present invention.
Figure 2:
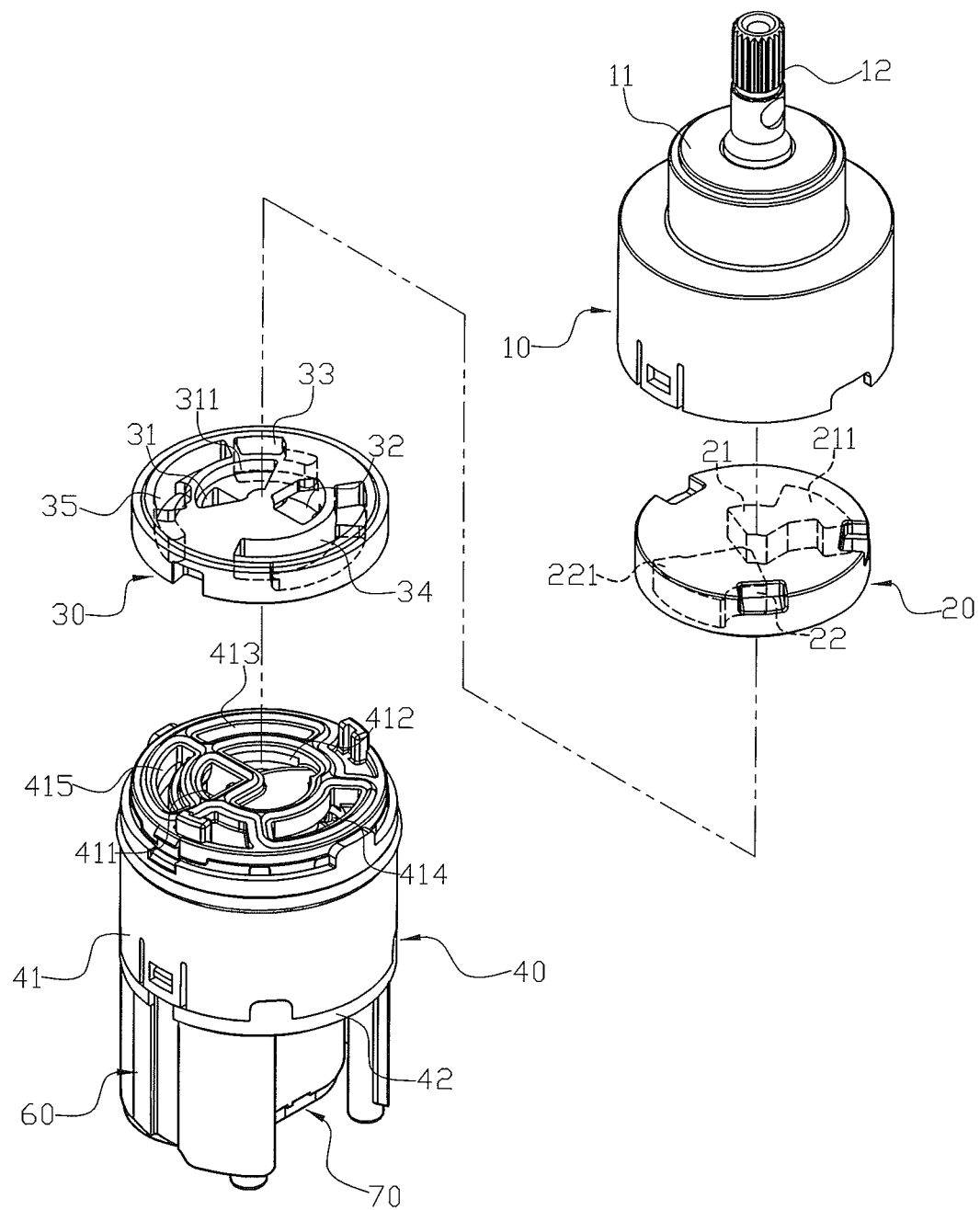
FIG. 2 is a partially exploded perspective view of the control balance valve in accordance with the preferred embodiment of the present invention.
Figure 3:
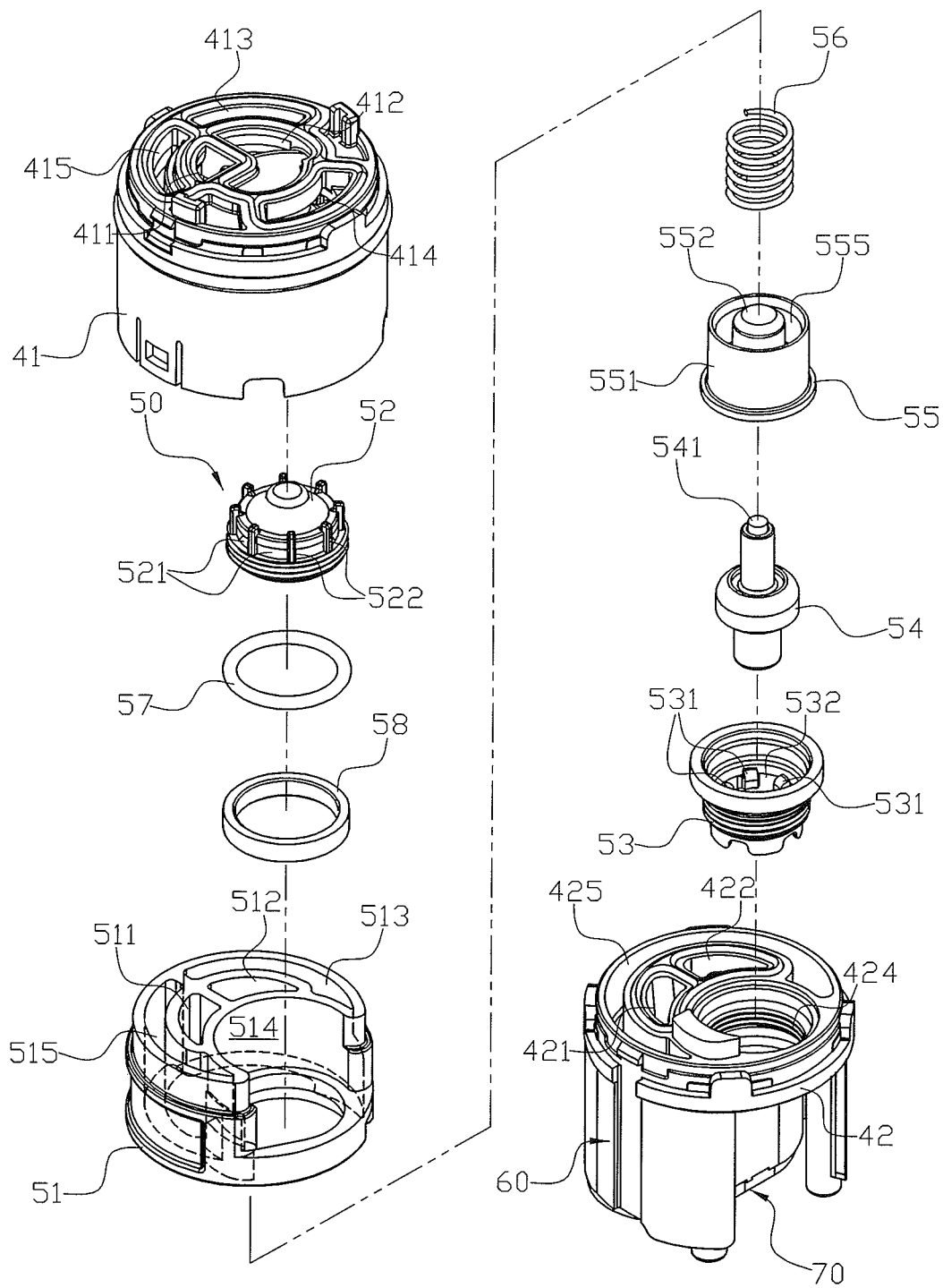
FIG. 3 is a partially exploded perspective view of the control balance valve in accordance with the preferred embodiment of the present invention.
Figure 4:
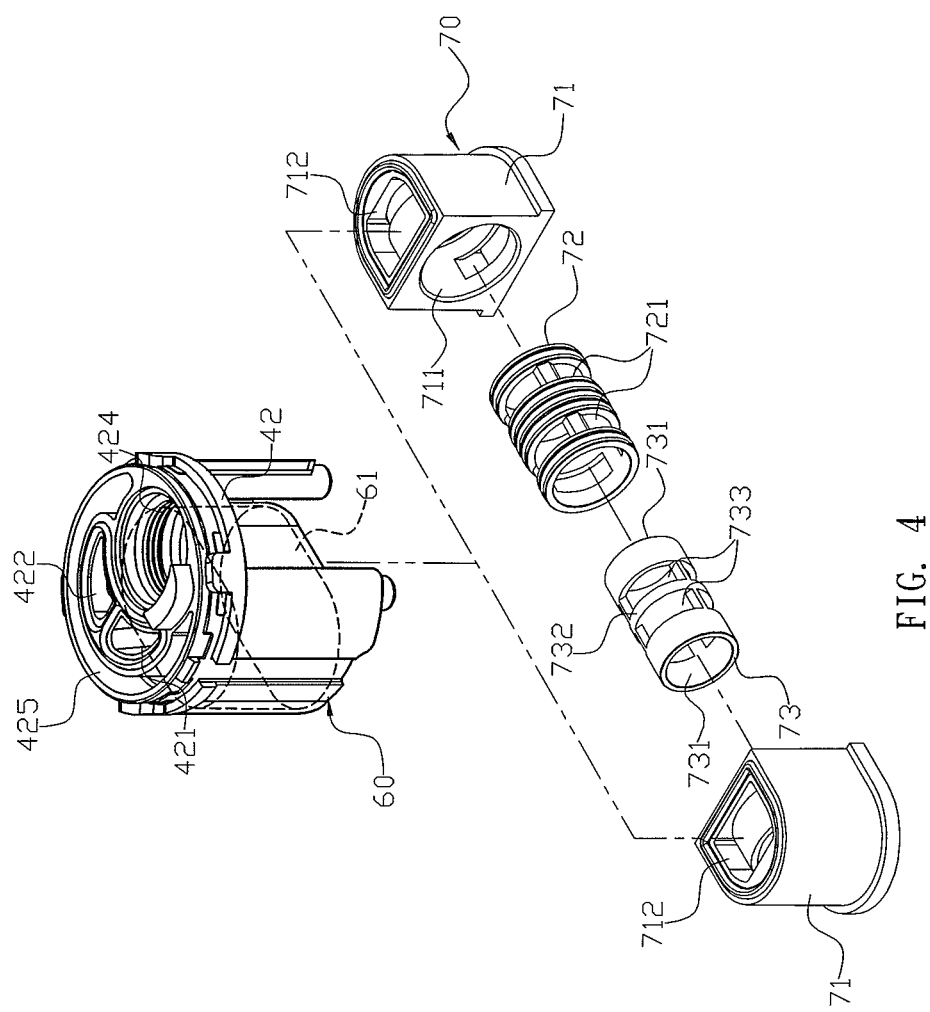
FIG. 4 is a partially exploded perspective view of the control balance valve in accordance with the preferred embodiment of the present invention.
Figure 6:
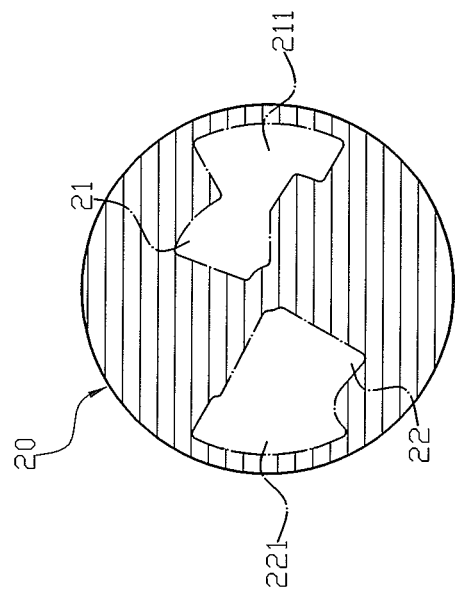
FIG. 6 is a cross-sectional view of the movable valve plate as shown in FIG. 5.
Figure 5:
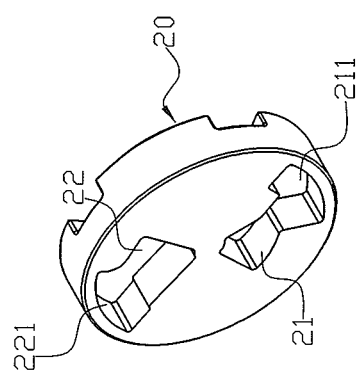
FIG. 5 is a perspective view of a movable valve plate in accordance with the preferred embodiment of the present invention.
Figure 8:
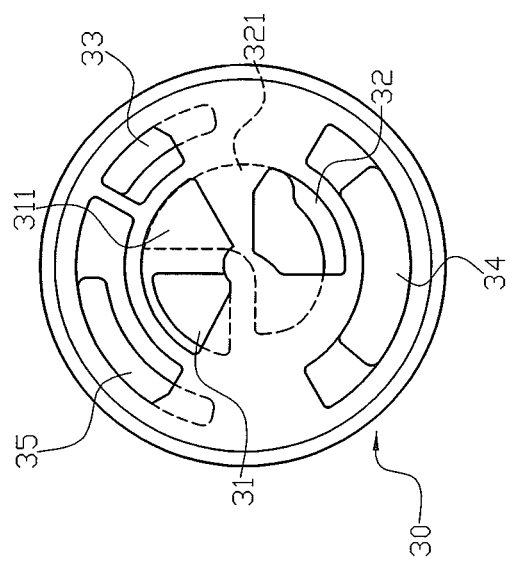
FIG. 8 is a plane view of the fixed valve plate as shown in FIG. 7.
Figure 7:
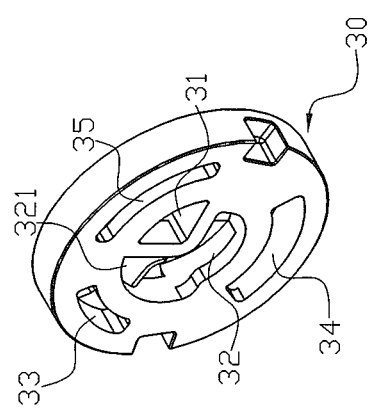
FIG. 7 is a perspective view of a fixed valve plate in accordance with the preferred embodiment of the present invention.
Figure 10:
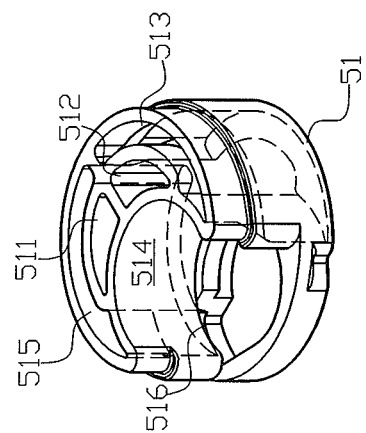
FIG. 10 is a perspective view of a water dividing member in accordance with the preferred embodiment of the present invention.
Figure 9:
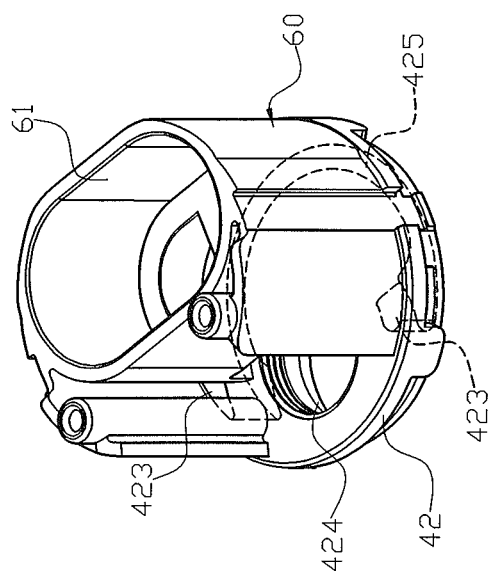
FIG. 9 is a bottom perspective view of a lower seat in accordance with the preferred embodiment of the present invention.
Figure 11:
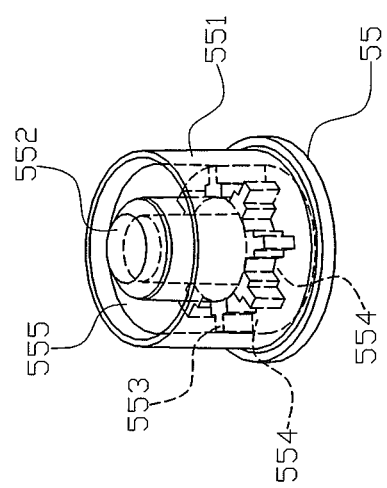
FIG. 11 is a perspective view of a water stop sleeve in accordance with the preferred embodiment of the present invention.

Referring to the drawings and initially to FIGS. 1-13, a swivel-type precision ceramics control balance valve in accordance with the preferred embodiment of the present invention comprises a valve housing 10, a rotary base 11 mounted in the valve housing 10, a valve lever 12 mounted on the rotary base 11 and protruding upward from the valve housing 10, a movable valve plate 20 mounted in the valve housing 10 and located under the rotary base 11, a fixed valve plate 30 mounted in the valve housing 10 and located under the movable valve plate 20, a valve seat 40 mounted on a lower end of the valve housing 10 to stop the fixed valve plate 30, the movable valve plate 20 and the rotary base 11, a temperature limiting device 50 mounted in the valve seat 40, a pedestal 60 connected with the valve seat 40, and a balance unit 70 mounted in the pedestal 60.

The rotary base 11 is locked onto the movable valve plate 20, and the valve lever 12 drives the rotary base 11 which drives the movable valve plate 20 to rotate relative to the fixed valve plate 30, to change a relative position between the movable valve plate 20 and the fixed valve plate 30, so as to turn on/off water of a faucet, to change a water flow rate, or to change a proportion of a mixture of cold and hot water.

The movable valve plate 20 is provided with a first cold water hole 21 and a first hot water hole 22 arranged diagonally. The first cold water hole 21 and the first hot water hole 22 extend upward from a bottom face of the movable valve plate 20. The first cold water hole 21 is provided with a first extension 211 to enlarge an extent of the first cold water hole 21. The first hot water hole 22 is provided with a second extension 221 to enlarge an extent of the first hot water hole 22.

The fixed valve plate 30 has a center provided with a second cold water hole 31 and a second hot water hole 32. The second cold water hole 31 and the second hot water hole 32 extend through the fixed valve plate 30. The second cold water hole 31 is provided with a third extension 311 extending downward from a top face of the fixed valve plate 30. The second hot water hole 32 is provided with a fourth extension 321 extending upward from a bottom face of the fixed valve plate 30. The fixed valve plate 30 is provided with a first cold water channel 33 located beside the second cold water hole 31 and a first hot water channel 34 located beside the second hot water hole 32. The first cold water channel 33 and the first hot water channel 34 extend through the fixed valve plate 30. The fixed valve plate 30 is provided with a first temperature regulating hole 35 located between the first cold water channel 33 and the first hot water channel 34. The first temperature regulating hole 35 is closer to the first cold water channel 33.

The valve seat 40 includes an upper seat 41 and a lower seat 42 combined together. The upper seat 41 has an interior provided with a receiving space for mounting the temperature limiting device 50. The upper seat 41 of the valve seat 40 has a top face provided with a third cold water hole 411, a third hot water hole 412, a second cold water channel 413, a second hot water channel 414 and a second temperature regulating hole 415. The upper seat 41 of the valve seat 40 supports the fixed valve plate 30, the movable valve plate 20 and the rotary base 11, and the fixed valve plate 30 is secured on the top face of upper seat 41. The lower seat 42 of the valve seat 40 is provided with a cold water inlet hole 421, a hot water inlet hole 422, at least one cold water outlet hole 423 and a mixed water outlet hole 424. The cold water inlet hole 421 is connected with a cold water source, and the hot water inlet hole 422 is connected with a hot water source.

In assembly, the third cold water hole 411, the third hot water hole 412, the second cold water channel 413, the second hot water channel 414 and the second temperature regulating hole 415 of the upper seat 41 respectively align with the second cold water hole 31, the fourth extension 321, the first cold water channel 33, the first hot water channel 34 and the first temperature regulating hole 35 of the fixed valve plate 30. In addition, the first cold water hole 21 and the first extension 211 of the movable valve plate 20 misalign with the first cold water channel 33 and the first temperature regulating hole 35 of the fixed valve plate 30, while the first hot water hole 22 and the second extension 221 of the movable valve plate 20 misalign with the second hot water hole 32 and the first hot water channel 34 of the fixed valve plate 30 under a normal state of the valve lever 12 which is not operated, so that the cold water and the hot water are stopped by the movable valve plate 20 and cannot flow outward from the faucet through the control balance valve.

The temperature limiting device 50 includes a water dividing member 51, a cap 52, a support sleeve 53, a temperature detector 54, a water stop sleeve 55 and a spring 56.

The water dividing member 51 is mounted between the upper seat 41 and the lower seat 42 of the valve seat 40. The water dividing member 51 is provided with a fourth cold water hole 511 connected between the third cold water hole 411 and the cold water inlet hole 421, a fourth hot water hole 512 connected between the third hot water hole 412 and the hot water inlet hole 422, a third cold water channel 513 connected between the second cold water channel 413 and the at least one cold water outlet hole 423, a temperature control chamber 514 connected between the second hot water channel 414 and the mixed water outlet hole 424, a third temperature regulating hole 515 aligning with the second temperature regulating hole 415 of the upper seat 41, and a cold water passage 516 connected between the third temperature regulating hole 515 and the temperature control chamber 514. The third temperature regulating hole 515 extends downward from a top face of the water dividing member 51.

The cap 52 is mounted in the temperature control chamber 514 of the water dividing member 51 and has an opening directed downward. The cap 52 has a periphery provided with a plurality of hot water passages 521 extending through the cap 52.

The support sleeve 53 is mounted in the mixed water outlet hole 424 of the lower seat 42 and has an interior provided with a plurality of claws 531 and a plurality of water outlet channels 532 arranged between the claws 531.

The temperature detector 54 is mounted in the support sleeve 53 and supported by the claws 531. The temperature detector 54 has an opening provided with a push rod 541 and a chemical substance 542. The chemical substance 542 is filled between the temperature detector 54 and the push rod 541. The chemical substance 542 has a thermal expansion and contraction feature due to a temperature change of the ambient environment. When the chemical substance 542 is heated and expanded, the push rod 541 is pushed outward from the opening of the temperature detector 54 by the chemical substance 542, and when the chemical substance 542 is cooled and contracted, the push rod 541 is retracted into the opening of the temperature detector 54.

The water stop sleeve 55 is mounted on the temperature detector 54 and includes a tubular body 551, a cover 552 located in the tubular body 551, and a bottom edge 553 connecting the tubular body 551 and the cover 552. The cover 552 has an opening directed downward. The bottom edge 553 is provided with a plurality of water passages 554 extending through the bottom edge 553. The push rod 541 of the temperature detector 54 extends into the cover 552.

The spring 56 is biased between the cap 52 and the water stop sleeve 55. When the push rod 541 is retracted at a normal state, the spring 56 presses the water stop sleeve 55 away from the cap 52 to space the tubular body 551 of the water stop sleeve 55 from the hot water passages 521 of the cap 52, thereby preventing the tubular body 551 of the water stop sleeve 55 from blocking the hot water passages 521 of the cap 52. In addition, the water stop sleeve 55 is lifted by the temperature detector 54, to prevent the tubular body 551 of the water stop sleeve 55 from blocking the cold water passage 516 of the water dividing member 51, so that the cold water passage 516 of the water dividing member 51 is connected to the water outlet channels 532 of the support sleeve 53 constantly.

The pedestal 60 protrudes outward from a bottom face of the lower seat 42. The pedestal 60 is provided with a receiving chamber 61 connected to the cold water inlet hole 421 and the hot water inlet hole 422.

The balance unit 70 is mounted in the receiving chamber 61 of the pedestal 60 and includes two casings 71 juxtaposed to each other, a fixed tube 72 mounted between the two casings 71, and a movable core 73 movably mounted in the fixed tube 72. Each of the two casings 71 is provided with a horizontal mounting recess 711. Each of the two casings 71 is provided with a water delivery hole 712 connected to the mounting recess 711 and extending through a top face and a bottom face of each of the two casings 71. The water delivery holes 712 of the two casings 71 align with the cold water inlet hole 421 and the hot water inlet hole 422 respectively. The fixed tube 72 is secured in the mounting recess 711 of each of the two casings 71 and has a peripheral wall provided with two first breaches 721. At least one gasket is mounted on the fixed tube 72. The movable core 73 has an interior provided with two compartments 731 and a baffle 732 between the two compartments 731. The movable core 73 has a peripheral wall provided with two second breaches 733 connected to the two compartments 731 respectively. The movable core 73 is movable in the fixed tube 72 by variation of a water pressure of the cold and hot water, to change a relative position between the two second breaches 733 of the movable core 73 and the two first breaches 721 of the fixed tube 72, so as to balance the water pressure automatically.

In the preferred embodiment of the present invention, the first cold water channel 33 has an upper part extending through the top face of the fixed valve plate 30 and a lower part extending through the bottom face of the fixed valve plate 30. The upper part and the lower part of the first cold water channel 33 are staggered and connected mutually.

In the preferred embodiment of the present invention, the first hot water channel 34 has an upper part extending through the top face of the fixed valve plate 30 and a lower part extending through the bottom face of the fixed valve plate 30. The upper part and the lower part of the first hot water channel 34 are staggered and connected mutually.

In the preferred embodiment of the present invention, the first temperature regulating hole 35 has an upper part extending through the top face of the fixed valve plate 30 and a lower part extending through the bottom face of the fixed valve plate 30. The upper part and the lower part of the first temperature regulating hole 35 are staggered and connected mutually.

In the preferred embodiment of the present invention, the lower seat 42 of the valve seat 40 is provided with a water flow channel 425 corresponding to the third cold water channel 513 of the water dividing member 51. The water flow channel 425 has at least one end extending through the at least one cold water outlet hole 423

In the preferred embodiment of the present invention, the temperature control chamber 514 has a side having an upper section penetrating outward.

In the preferred embodiment of the present invention, the cap 52 is locked in the temperature control chamber 514 of the water dividing member 51.

In the preferred embodiment of the present invention, the periphery of the cap 52 is provided with a plurality of ribs 522 protruding upward from a top face of the cap 52. The hot water flows through gaps between the ribs 522 and the hot water passages 521 into the cap 52 by separation of the ribs 522.

In the preferred embodiment of the present invention, the temperature limiting device 50 further includes an O-ring 57 and a water stop ring 58 mounted in the temperature control chamber 514 and located under the cap 52.

In the preferred embodiment of the present invention, the support sleeve 53 is locked in the mixed water outlet hole 424 of the lower seat 42.

In the preferred embodiment of the present invention, the chemical substance 542 is heated and expanded at a temperature of forty degrees (40° C.).

In the preferred embodiment of the present invention, the water stop sleeve 55 has an annular groove 555 defined between the tubular body 551 and the cover 552. The spring 56 is mounted in the annular groove 555 and has one end resting on the bottom edge 553 of the water stop sleeve 55. The spring 56 has a diameter smaller than that of the annular groove 555 and that of the bottom edge 553, thereby preventing the spring 56 from blocking the water passages 554.

In the preferred embodiment of the present invention, the lower seat 42 of the valve seat 40 and the pedestal 60 are formed integrally.

In the preferred embodiment of the present invention, the balance unit 70 further includes two elastic members (not shown) each mounted in one of the two compartments 731 of the movable core 73 and each biased between the baffle 732 and one of the two casings 71, so that the movable core 73 is pushed by the two elastic members and is kept at a middle position at a normal state.

Figure 14:
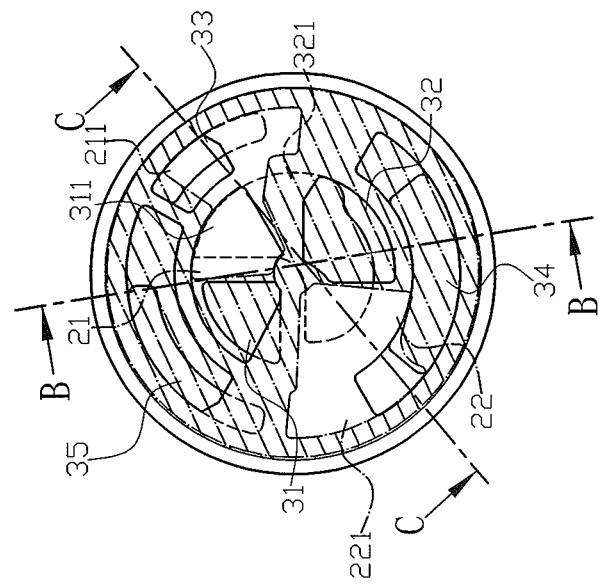
FIG. 14 is a schematic view showing the relative position of the movable valve plate and the fixed valve plate when the cold water is supplied.
Figure 12:
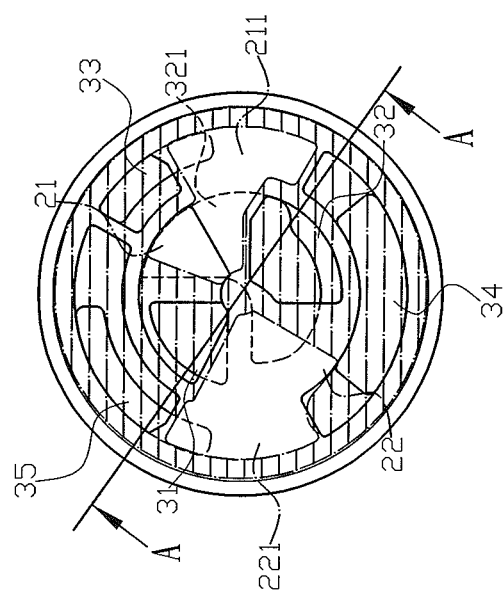
FIG. 12 is a schematic view showing the relative position of the movable valve plate and the fixed valve plate when the water flow is shut.
Figure 13:
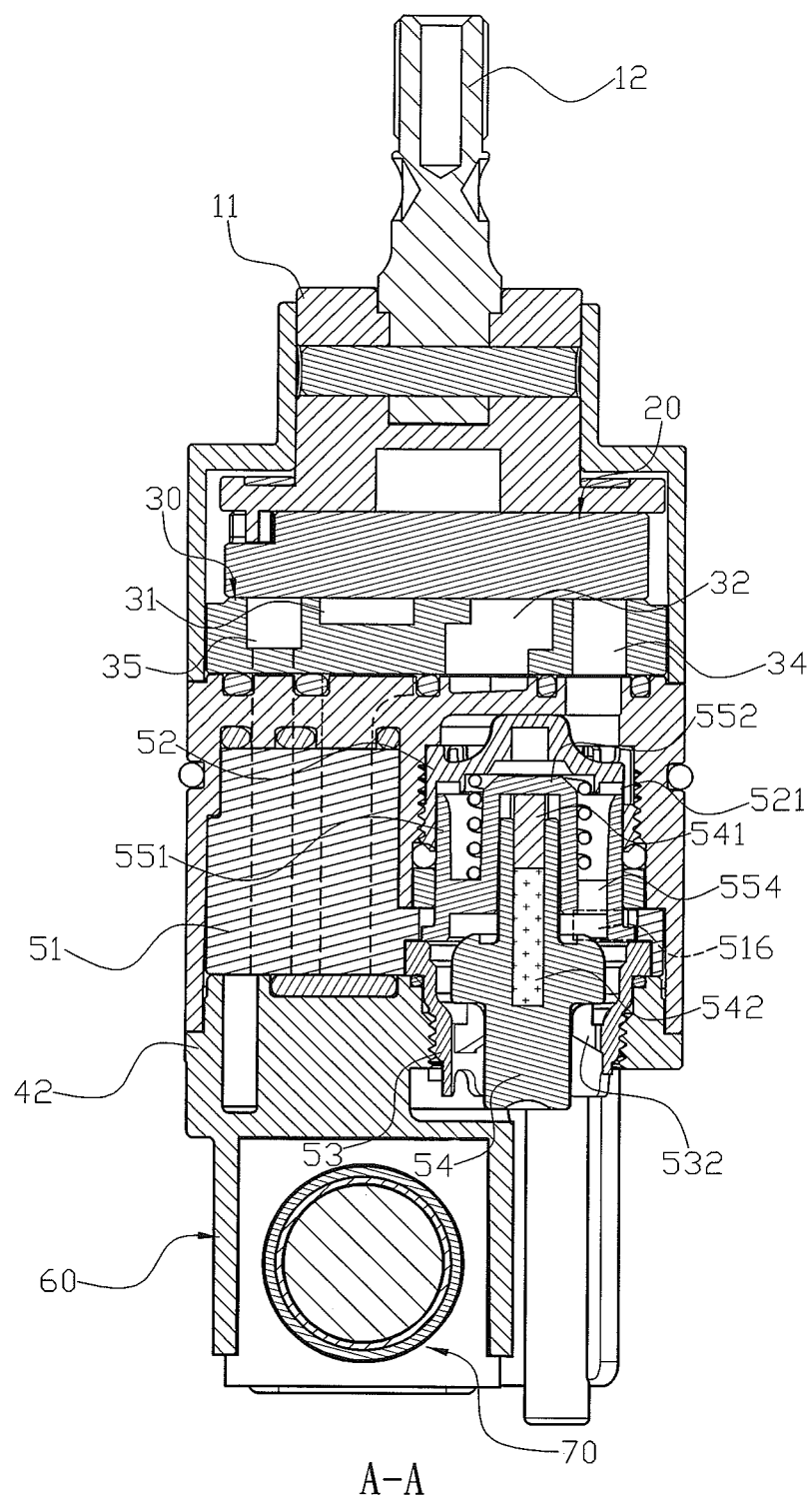
FIG. 13 is a cross-sectional view showing the water flow is shut.
Figure 15:
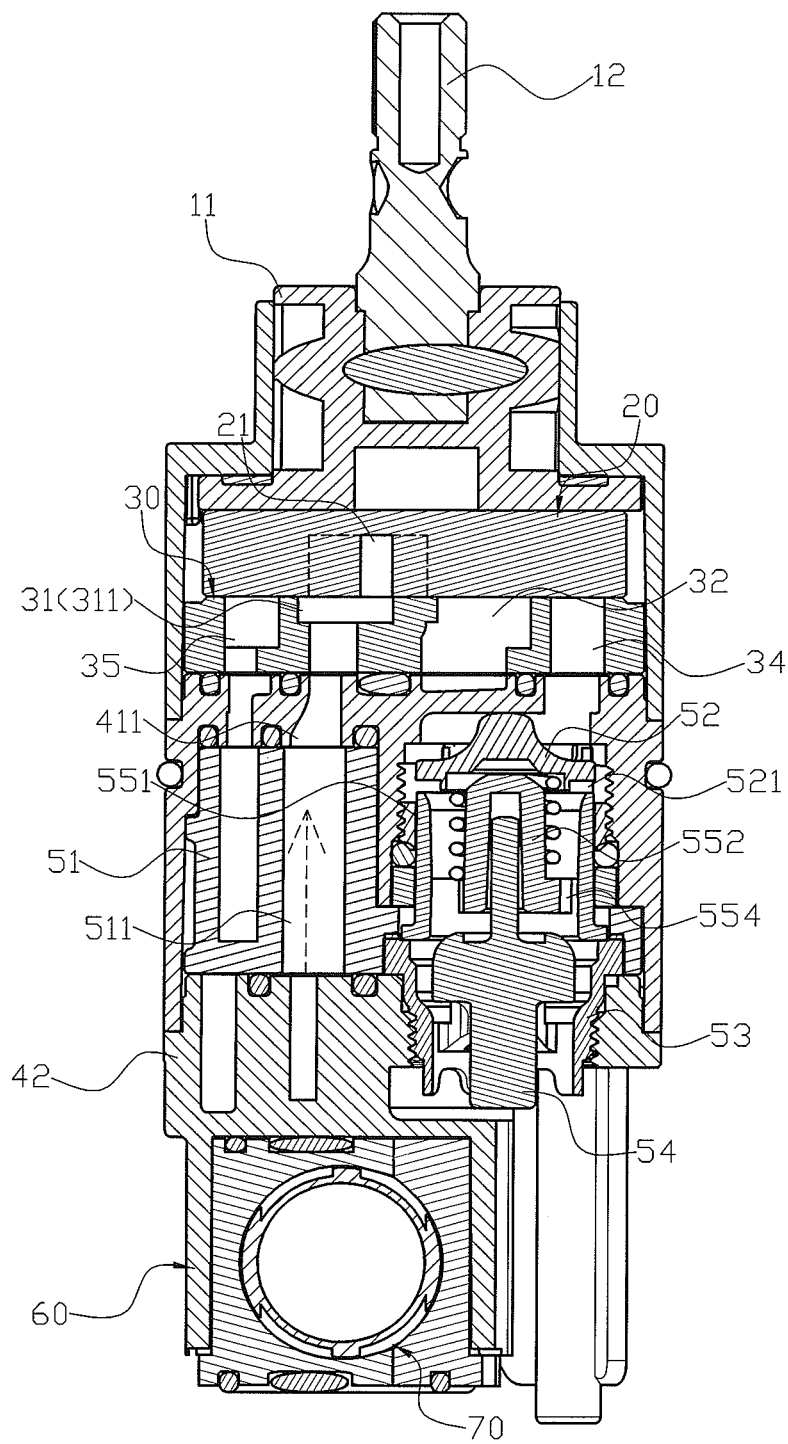
FIG. 15 is a cross-sectional view showing the cold water is supplied.
Figure 16:
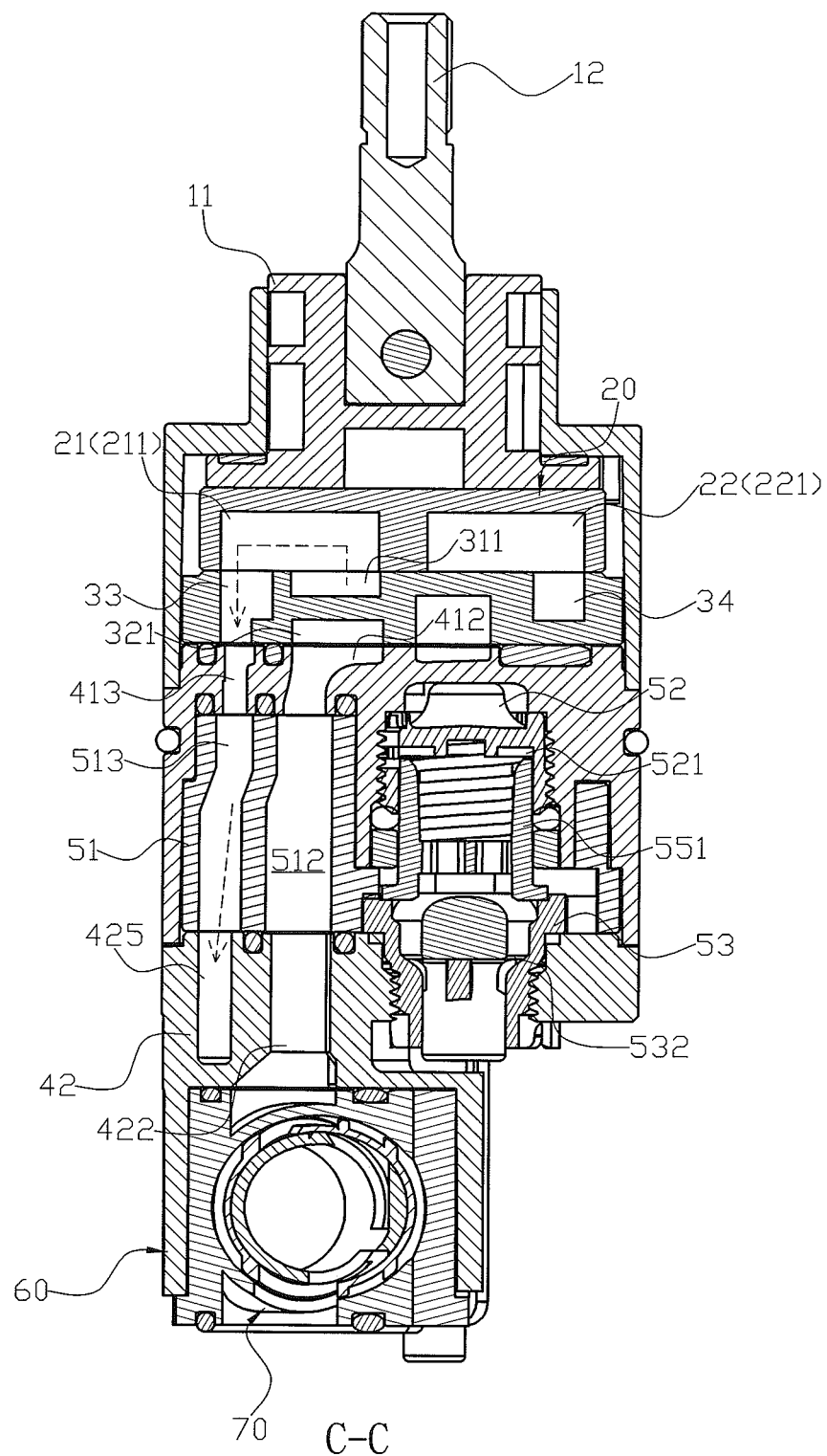
FIG. 16 is another cross-sectional view showing the cold water is supplied.

In operation, referring to FIGS. 14-16 with reference to FIGS. 1-13, the control balance valve is mounted on a valve chamber of the faucet, and the valve lever 12 is externally connected with a handle. When the handle is rotated, the valve lever 12 drives the rotary base 11 which drives the movable valve plate 20 to rotate relative to the fixed valve plate 30, so that the first cold water hole 21 and the first extension 211 of the movable valve plate 20 align with the third extension 311 and the first cold water channel 33 of the fixed valve plate 30 simultaneously as shown in FIG. 16. In such a manner, as shown in FIGS. 15 and 16, the cold water in turn flows through the balance unit 70, the cold water inlet hole 421, the fourth cold water hole 511, the third cold water hole 411, the second cold water hole 31 and the third extension 311 into the control balance valve, then flows through the first cold water hole 21 and the first extension 211, then in turn flows through the first cold water channel 33, the second cold water channel 413, the third cold water channel 513 and the at least one cold water outlet hole 423, and finally flows out of the faucet. At this time, the first hot water hole 22 and the second extension 221 of the movable valve plate 20 misalign with the second hot water hole 32 when the movable valve plate 20 is rotated, to prevent the hot water from flowing out of the faucet, so that only the cold water is allowed to pass through the faucet.

Figure 17:
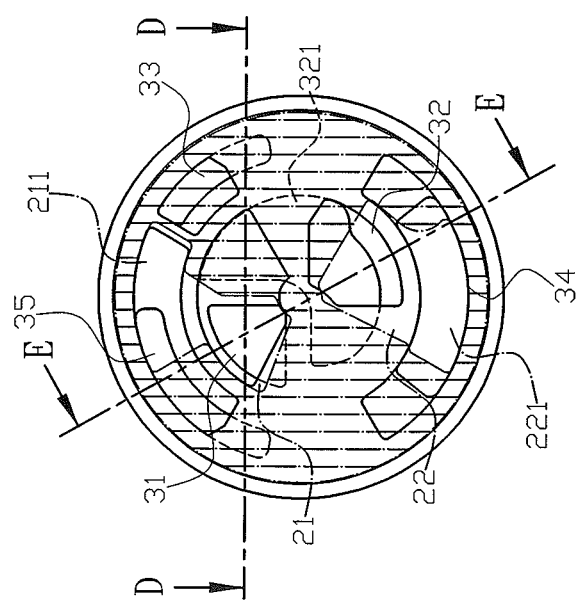
FIG. 17 is a schematic view showing the relative position of the movable valve plate and the fixed valve plate when the cold water and the hot water are mixed.
Figure 18:
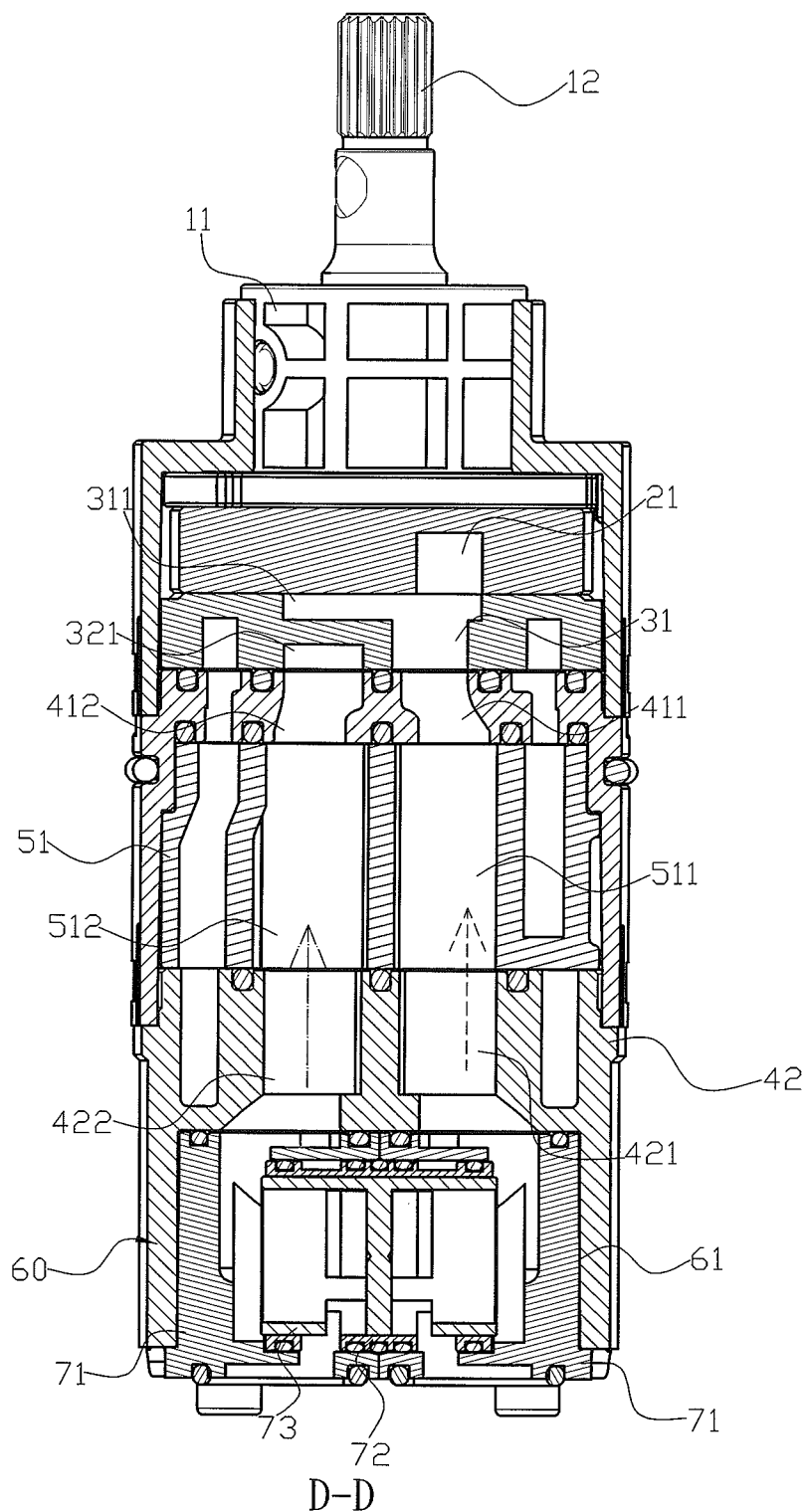
FIG. 18 is a cross-sectional view showing the cold water and the hot water are mixed.
Figure 19:
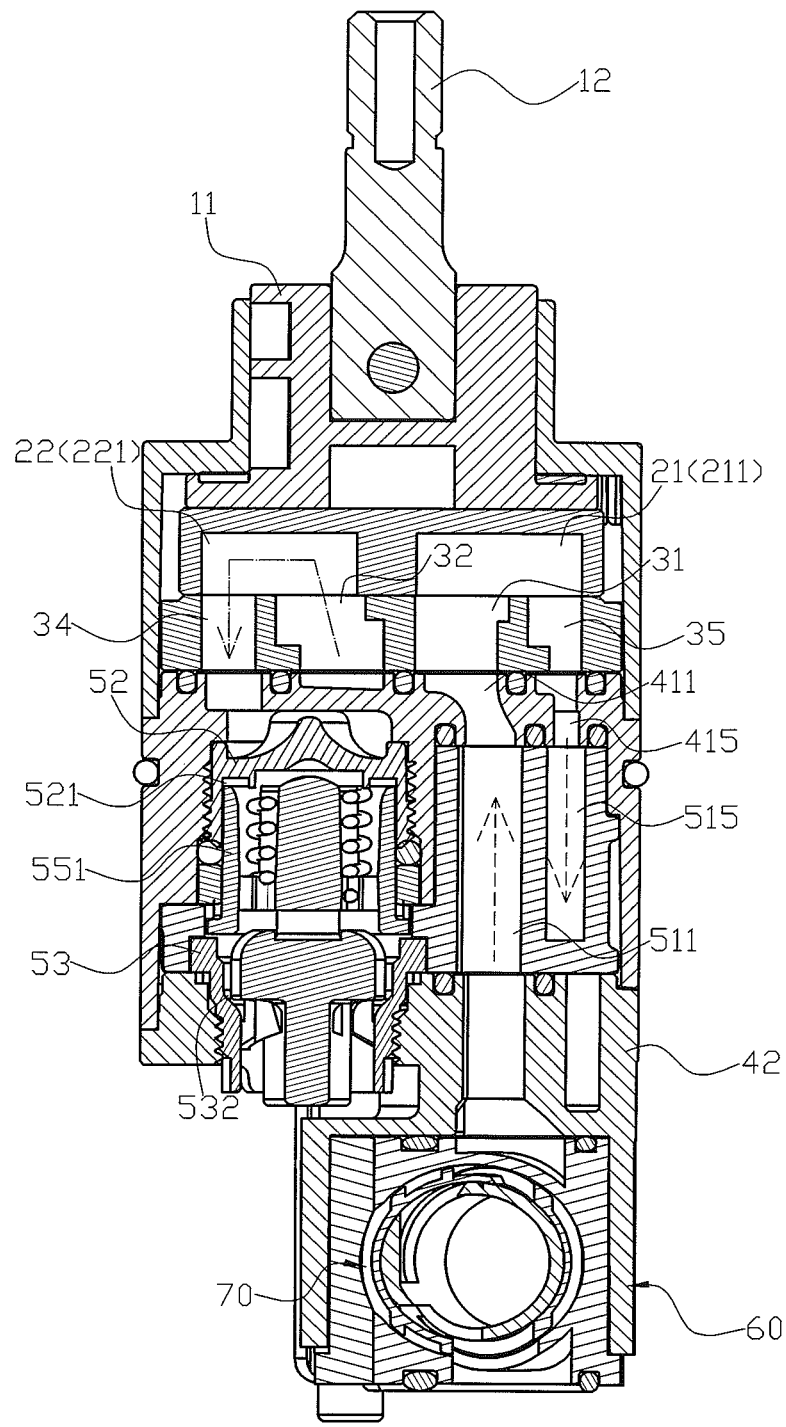
FIG. 19 is another cross-sectional view showing the cold water and the hot water are mixed.

Referring to FIGS. 17-19 with reference to FIGS. 1-13, when the handle is turned successively in the same direction, the movable valve plate 20 is further rotated relative to the fixed valve plate 30, so that the first hot water hole 22 and the second extension 221 of the movable valve plate 20 align with the second hot water hole 32 and the first hot water channel 34 of the fixed valve plate 30 simultaneously as shown in FIG. 19. In such a manner, as shown in FIGS. 18 and 19, the hot water in turn flows through the balance unit 70, the hot water inlet hole 422, the fourth hot water hole 512, the third hot water hole 412 and the second hot water hole 32 into the control balance valve, then flows through the first hot water hole 22 and the second extension 221 of the movable valve plate 20, then in turn flows through the first hot water channel 34, the second hot water channel 414, the hot water passages 521 of the cap 52, the water passages 554 of the water stop sleeve 55, the water outlet channels 532 of the support sleeve 53 and the mixed water outlet hole 424 of the lower seat 42, and finally flows out of the faucet.

In addition, when the handle is turned successively, the first cold water hole 21 and the first extension 211 of the movable valve plate 20 align with the second cold water hole 31 and the first temperature regulating hole 35 of the fixed valve plate 30, so that the cold water in turn flows through the balance unit 70, the cold water inlet hole 421, the fourth cold water hole 511, the third cold water hole 411 and the second cold water hole 31 into the control balance valve, then flows through the first cold water hole 21 and the first extension 211, and then in turn flows through the first temperature regulating hole 35, the second temperature regulating hole 415, the third temperature regulating hole 515 and the cold water passage 516 into the support sleeve 53. Thus, the cold water and the hot water are mixed in the support sleeve 53 to form a mixed water which flows out of the faucet.

Figure 20:
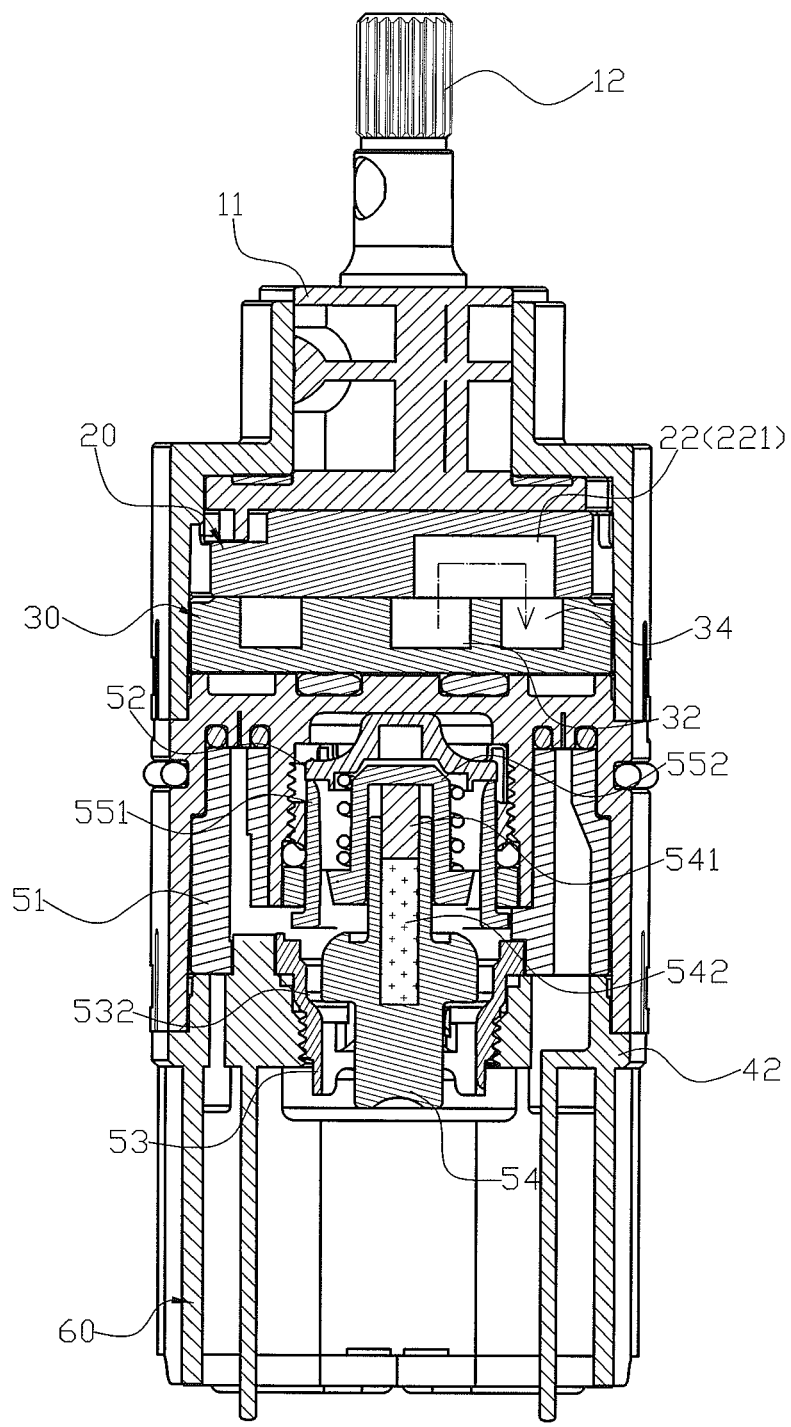
FIG. 20 is a cross-sectional view showing the hot water is stopped by the water stop sleeve.

Referring to FIG. 20 with reference to FIGS. 1-13, when the handle is turned to an excessive extent or when the cold water flow from the cold water source is too small, the temperature of the temperature detector 54 is increased to a determined value, so that the chemical substance 542 is heated and expanded, and the push rod 541 is pushed by the chemical substance 542, to lift the water stop sleeve 55. When the water stop sleeve 55 is lifted, the tubular body 551 of the water stop sleeve 55 extends into the cap 52 to gradually reduce the diameter of the hot water passages 521 or seal the hot water passages 521 completely, so as to stop the hot water. In such a manner, the hot water with an excessive high temperature is shut entirely or cooled to reduce its temperature, thereby preventing the user from being scalded by the hot water. In addition, when the child plays and rotates the handle curiously, the control balance valve regulates the hot water at a determined temperature, so that the water output is kept at a constant value, thereby preventing the hot water from scalding the child.

Figure 21:
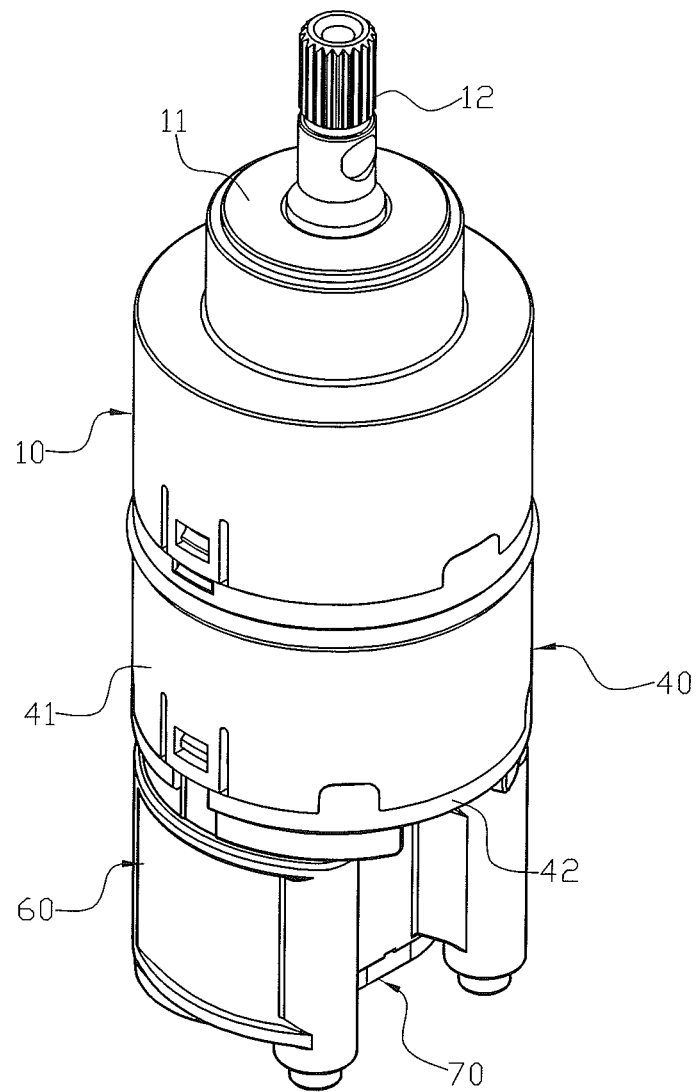
FIG. 21 is a perspective view of a control balance valve in accordance with another preferred embodiment of the present invention.
Figure 22:
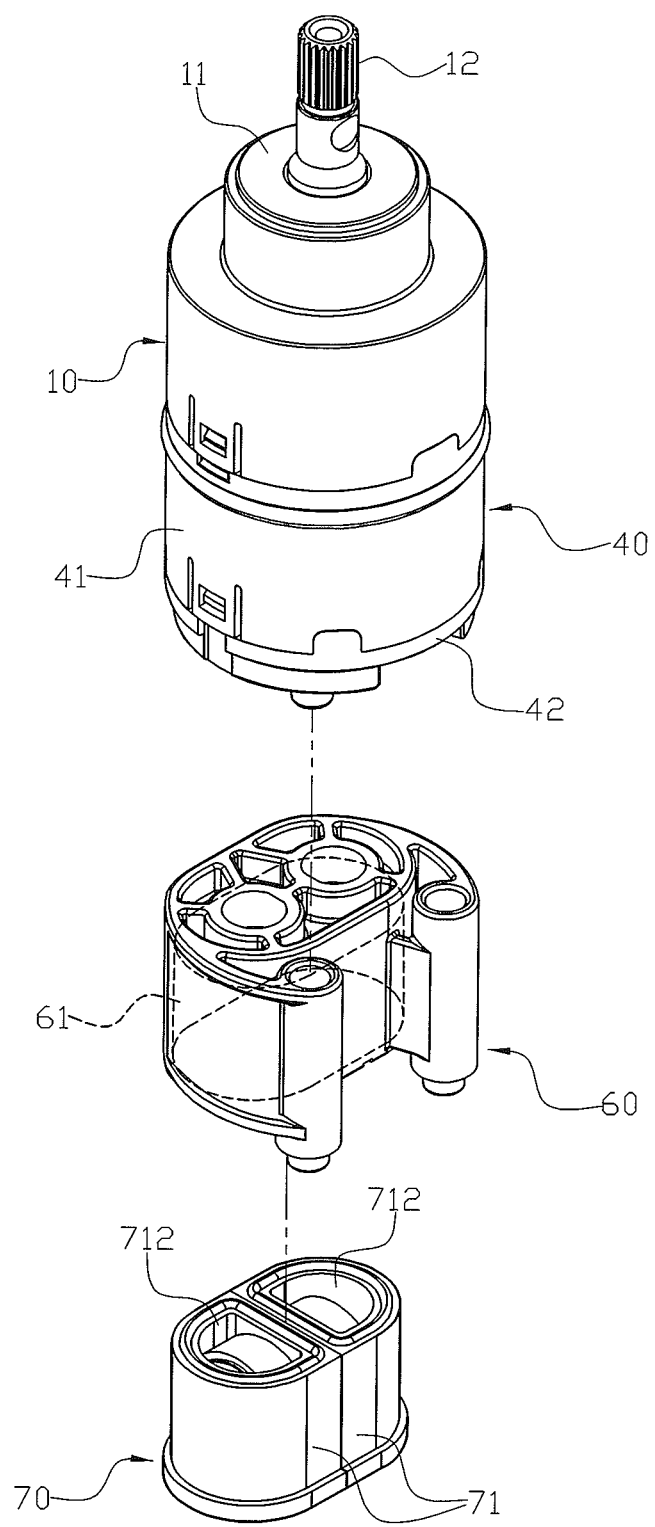
FIG. 22 is a partially exploded perspective view of the control balance valve as shown in FIG. 21.

Referring to FIGS. 21 and 22, the lower seat 42 of the valve seat 40 and the pedestal 60 are formed independently and are assembled together.

Accordingly, when the temperature of the temperature detector 54 is increased to a determined value due to an excessive hot water, the chemical substance 542 is expanded to push the push rod 541 which lifts the water stop sleeve 55, so that the tubular body 551 of the water stop sleeve 55 gradually reduces the diameter of the hot water passages 521 or seals the hot water passages 521 completely, so as to stop the hot water, thereby preventing the user from being scalded by the hot water. In addition, when the child plays and pulls the handle curiously, the control balance valve controls the hot water at a determined moderate temperature, so that the water output is kept at a constant value, thereby preventing the hot water from scalding the child. Further, the balance unit 70 balances the water pressure of the cold and hot water automatically.

Although the invention has been explained in relation to its preferred embodiment(s) as mentioned above, it is to be understood that many other possible modifications and variations can be made without departing from the scope of the present invention. It is, therefore, contemplated that the appended claim or claims will cover such modifications and variations that fall within the scope of the invention.

The invention claimed is:

1. A control balance valve comprising:
   a valve housing;
   a rotary base mounted in the valve housing;
   a valve lever mounted on the rotary base and protruding upward from the valve housing;
   a movable valve plate mounted in the valve housing and located under the rotary base;
   a fixed valve plate mounted in the valve housing and located under the movable valve plate;
   a valve seat mounted on a lower end of the valve housing to stop the fixed valve plate, the movable valve plate and the rotary base; and
   a pedestal connected with the valve seat;
   wherein the rotary base is locked onto the movable valve plate, and the valve lever drives the rotary base which drives the movable valve plate to rotate relative to the fixed valve plate; the movable valve plate is provided with a first cold water hole and a first hot water hole which are arranged diagonally; the fixed valve plate has a center provided with a second cold water hole and a second hot water hole; the valve seat includes an upper section and a lower section combined together; and the lower section of the valve seat and the pedestal are formed integrally,
   wherein the first cold water hole has a first extension to enlarge an extent of the first cold water hole, and the first hot water hole has a second extension to enlarge an extent of the first hot water hole; the first cold water hole and the first extension misalign with a first cold water channel and a first temperature regulating hole of the fixed valve plate, while the first hot water hole and the second extension misalign with the second hot water hole and a first hot water channel of the fixed valve plate under a state that the valve lever is not operated, so that the cold water and the hot water are stopped by the movable valve plate and cannot flow outward from the faucet through the control balance valve.

2. A control balance valve comprising:
   a valve housing;
   a rotary base mounted in the valve housing;
   a valve lever mounted on the rotary base and protruding upward from the valve housing;
   a movable valve plate mounted in the valve housing and located under the rotary base;
   a fixed valve plate mounted in the valve housing and located under the movable valve plate;
   a valve seat mounted on a lower end of the valve housing to stop the fixed valve plate, the movable valve plate and the rotary base; and a pedestal connected with the valve seat;
   wherein the rotary base is locked onto the movable valve plate, and the valve lever drives the rotary base which drives the movable valve plate to rotate relative to the fixed valve plate; the movable valve plate is provided with a first cold water hole and a first hot water hole which are arranged diagonally; the fixed valve plate has a center provided with a second cold water hole and a second hot water hole; the valve seat includes an upper section and a lower section combined together; and the lower section of the valve seat and the pedestal are formed independently and are assembled together,
   wherein the first cold water hole has a first extension to enlarge an extent of the first cold water hole, and the first hot water hole has a second extension to enlarge an extent of the first hot water hole; the first cold water hole and the first extension misalign with a first cold water channel and a first temperature regulating hole of the fixed valve plate, while the first hot water hole and the second extension misalign with the second hot water hole and a first hot water channel of the fixed valve plate under a state that the valve lever is not operated, so that the cold water and the hot water are stopped by the movable valve plate and cannot flow outward from the faucet through the control balance valve.

* * * * *